(12) United States Patent
Seifert et al.

(10) Patent No.: US 7,933,823 B1
(45) Date of Patent: Apr. 26, 2011

(54) ORDER PROCESSING APPARATUS AND METHOD

(75) Inventors: Benedict Seifert, Marlow (GB); Robert Hesselbo, Oxford (GB)

(73) Assignee: Advanced Transaction Systems Limited (GB)

( * ) Notice: Subject to any disclaimer, the term of this patent is extended or adjusted under 35 U.S.C. 154(b) by 0 days.

(21) Appl. No.: 09/508,778

(22) PCT Filed: Sep. 17, 1998

(86) PCT No.: PCT/GB98/02818
§ 371 (c)(1),
(2), (4) Date: May 15, 2000

(87) PCT Pub. No.: WO99/14695
PCT Pub. Date: Mar. 25, 1999

(30) Foreign Application Priority Data

Sep. 17, 1997 (GB) .................................. 9719829.5

(51) Int. Cl.
*G06Q 40/00* (2006.01)
(52) U.S. Cl. ............................ 705/36 R; 705/35; 705/37
(58) Field of Classification Search .................. 705/35, 705/36 R, 37
See application file for complete search history.

(56) References Cited

U.S. PATENT DOCUMENTS

| | | | |
|---|---|---|---|
| 3,573,747 A | 4/1971 | Adams et al. | |
| 4,412,287 A | 10/1983 | Braddock, III | |
| 4,903,201 A | 2/1990 | Wagner | |
| 5,136,501 A | 8/1992 | Silverman et al. | |
| 5,297,031 A | 3/1994 | Gutterman et al. | |
| 5,563,783 A | 10/1996 | Stolfo et al. | |
| 5,845,266 A * | 12/1998 | Lupien et al. | 705/36 R |

FOREIGN PATENT DOCUMENTS

| | | |
|---|---|---|
| EP | 0 401 203 | 12/1990 |
| WO | WO 96/05563 | 2/1996 |
| WO | WO 96/34357 | 10/1996 |

(Continued)

OTHER PUBLICATIONS

"Online Stock Trading System: Study of An Application"—Computer Society International Conference. Feb. 23-27, 1987 (1 sheet) pp. 161 and 162.

(Continued)

*Primary Examiner* — Daniel S Felten
(74) *Attorney, Agent, or Firm* — Harness, Dickey & Pierce, P.L.C.

(57) ABSTRACT

An apparatus for processing trading orders, comprising: a central server connectable to a plurality of terminals on which user orders are to be entered. The central server further comprises: communication means for transmitting user orders between said terminals and said central server via a network; first storage means for storing received user orders as an array whose elements define a particular first resource ordered by a particular user; the first storage means is also to be used for storing the resources that may be offered by users for exchange against the first resource ordered; second storage means for storing an array of coefficients each representing the proportion of a particular order that is to be satisfied; processing means for retrieving the orders from the first storage means, calculating an optimized set of values of the coefficients with respect to at least one predetermined, adjustable constraint and at least one predetermined, adjustable criterion, storing the optimized coefficient values in said second storage means; and output means for communicating the processed orders and their respective coefficients.

28 Claims, 3 Drawing Sheets

FOREIGN PATENT DOCUMENTS

WO 97/29584 8/1997

OTHER PUBLICATIONS

"Nordex: automated trading for Nordic equities"; Computers in the City 89—Nov. 14-16, 1989—pp. 53-61.

"How Computer Assisted Trading Is Making the Toronto Stock Exchange Purr"; Wall Street Computer Review—Dec. 1987, pp. 71-77, 97.

International Search Report dated Feb. 3, 1999.

* cited by examiner

ORDER PROCESSING APPARATUS AND METHOD

The present invention relates to an apparatus and method for optimising the allocation of resources based on received orders.

A wide variety of systems exists in which a set of users each submit orders which consist of a desired quantity of a given objective or resource which it is willing to exchange for a certain other resource. Examples include a computer scheduling system allocating computing resources to users or to jobs submitted by users; electricity generating plants offering to supply power to a distribution system at different costs and generated from different fuels; a computer processor allocating resources such as memory and I/O bandwidth to different internal processes or software applications; and financial traders offering to buy and sell resources or quantities of financial instruments, such as stocks or currencies, in exchange for other financial instruments.

A number of different technical solutions have been used for the above allocation or matching problem. One example is binary matching in which an offer by one user to sell a particular quantity of one instrument is matched to an offer by a different user to buy that quantity of that instrument. A second example, in the case of scheduling computer jobs, is to allocate a slice of processor time to each user in turn on a rotational basis.

These solutions suffer from a number of drawbacks, namely that generally speaking the allocation of resources is not optimal. For example, supply and demand are not matched as well as they could be, such as in a computer, the majority of CPU cycles are idle, but at peak load the operation of the computer is limited by one of the resources available such as processor time, memory, I/O bandwidth. Scheduling systems do not necessarily take into account the priority of jobs, such as whether they are required in real time or can be batch processed, and allocating a time slice to each user in rotation is simply a compromise. The matching of orders is inefficient in that in a binary matching system the size of the order must be matched so that a very large order may never be matched unless it is broken down into a number of smaller orders. The matching is also inefficient because in a binary matching system matches involving more than 2 instruments can not in general be found which prevents optimal matches from being discovered. In a financial market this can lead to illiquidity which in turn, and counter-intuitively, can lead to the problem of market volatility.

The present invention seeks to alleviate at least partially some or all of the above problems.

Accordingly the present invention provides an apparatus for processing trading orders, said apparatus comprising a central server connectable to a plurality of terminals on which user orders are to be entered, wherein said central server comprises:
communication means for receiving user orders from said terminals via a network;
first storage means for storing received user orders as an array whose elements define a particular first resource ordered by a particular user;
second storage means for storing an array of coefficients each representing the proportion of a particular order that is to be satisfied; and
processing means for retrieving said orders from said first storage means, calculating an optimized set of values of said coefficients with respect to at least one predetermined, adjustable constraint and at least one predetermined, adjustable criterion, and storing said optimized coefficient values in said second storage means,
said communication means also being for transmitting the processed orders and their respective coefficients.

According to a further aspect of the present invention there is provided a method for processing trading orders comprising the steps of:
receiving from users orders each specifying a particular first resource ordered by a particular user and storing them as an array in a first storage means;
processing said orders retrieved from said first storage means to calculate a set of coefficients each representing the proportion of a particular order that is to be satisfied;
optimizing the values of said coefficients with respect to at least one predetermined, adjustable constraint and at least one predetermined, adjustable criterion;
storing said optimized coefficient values in a second storage means; and
outputting the processed orders and their respective coefficients.

Embodiments of the present invention can produce optimised solutions to the matching of orders for resources. The solutions are not sensitive to the sizes of particular received orders. The matching can be done in an un-biased manner and is transparent to the particular resources being traded. Embodiments of the present invention that improve the efficiency of a trading system can alleviate the problem of illiquidity.

Embodiments of the invention will now be described, by way of example only, with reference to the accompanying drawings in which.

Figure 1:
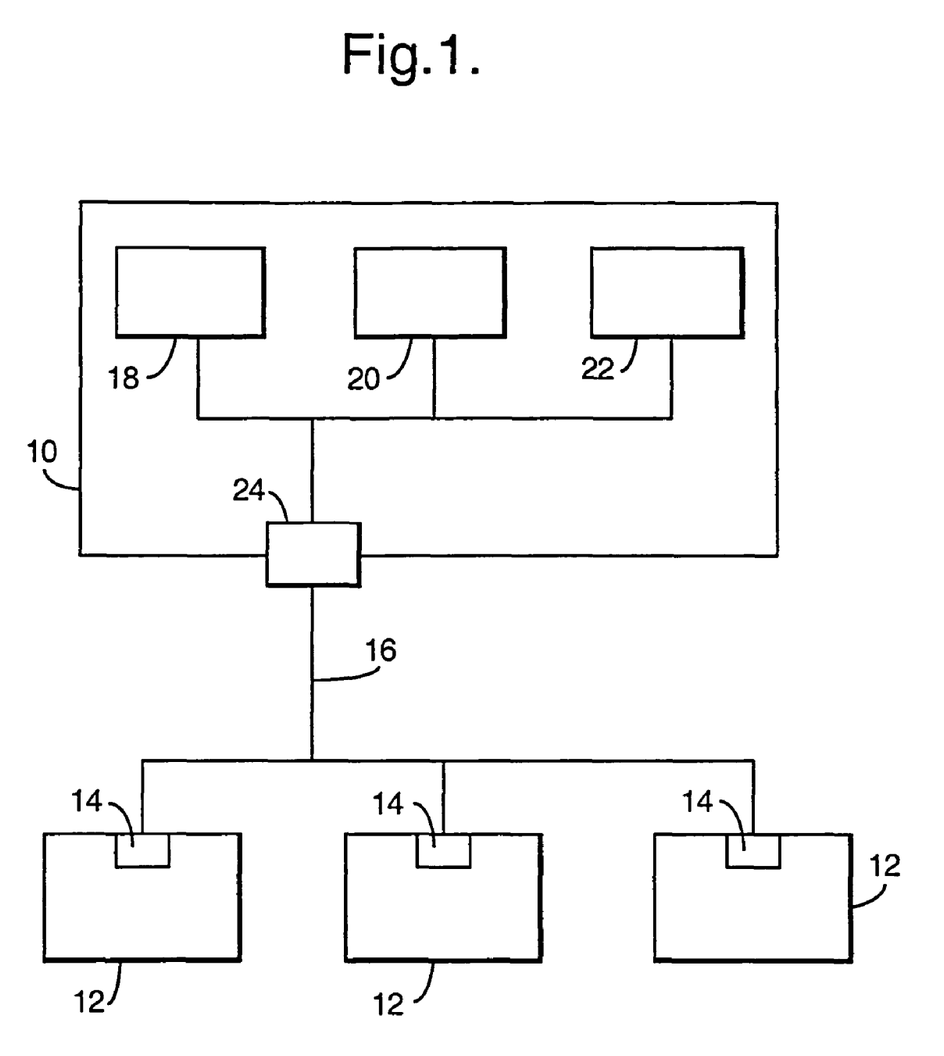
FIG. 1 shows an apparatus according to the present invention.

Referring to FIG. 1, one form of apparatus according to the invention comprises a central server 10 and a plurality of terminals 12 on which user orders are to be entered. The terminals 12 can be conventional personal computers (PC's) running appropriate software, or they may be dedicated trading terminals. Each terminal 12 is equipped with communication means 14 such as an interface and/or modem for transmitting the orders from the terminals 12 to the central server 10 via a network 16.

The central server 10 comprises a number of storage means. These may be devices such as memory chips or magnetic discs. The different storage means may comprise different regions within a common chip or disc or maybe distributed among several different physical devices. In particular the central server comprises a first storage means 18 for storing received user orders as an array whose elements define a particular first simple resource ordered by a particular user and second storage means 20 for storing an array of coefficients each representing the proportion of a particular order that is to be satisfied.

The central server further comprises processing means 22, such as a central processing unit (CPU) executing instructions of a particular piece of software. The processing means 22 is for retrieving orders from the first storage means 18, calculating an optimised set of values of the coefficients with respect to at least one pre-determined, adjustable constraint and at least one pre-determined, adjustable criterion, and storing said optimised coefficient values in the second storage means 20.

A communication means 24, such as an interface and/or modem, is comprised in the central server 10 for communicating the processed orders and their respective coefficients. Communications between the terminals 12 and central server 10 via the network 16 are preferably done via universal standards and protocols, such as TCP/IP and use a generally accepted interface, for instance an Internet browser. The communications may be done via a network, such as the internet, or an intranet to which all users of the broking system will be linked, and which is controlled by a central server. The orders entered by users are automatically passed on to the server in real time, and are matched in batches (whose length and frequency is controlled in software by the server) in an optimal sense as explained in this paper.

Figure 2:
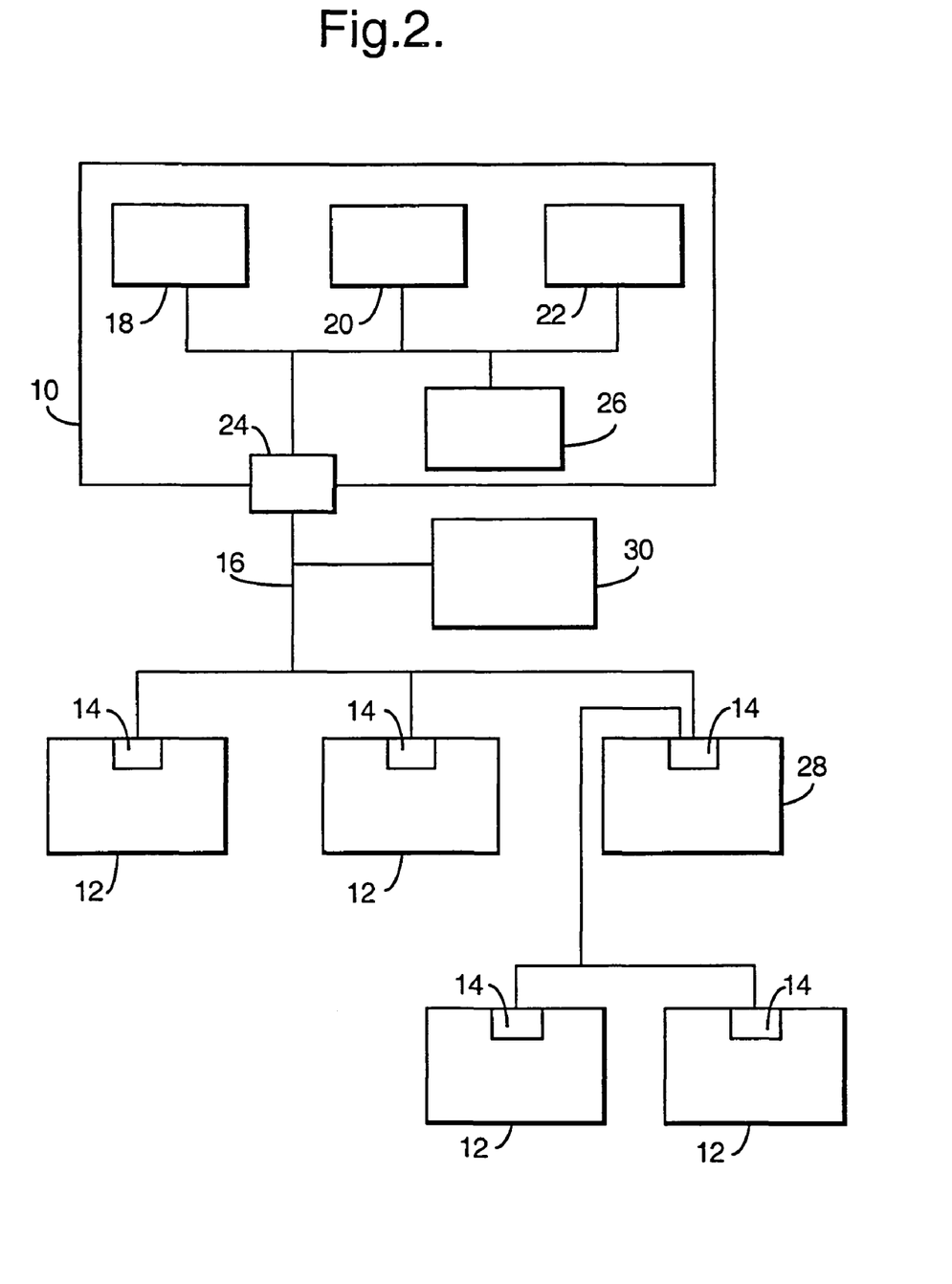
FIG. 2 shows a presently preferred embodiment of an apparatus according to the invention.

A second, presently preferred embodiment of the invention is illustrated in FIG. 2. Referring to FIG. 2, this embodiment includes all the features shown in FIG. 1, numbered with the same reference numerals, and several additional features. The additional features may be used with the apparatus of FIG. 1 either individually or in combination. The central server 10 further comprises a third storage means 26 for storing an array of data representing the current exchange rate between each traded resource and at least one other resource which exchange rate data can be retrieved by said processing means 22. The processing means 22 may also compute and update the exchange rate data in the third storage means 26 based on the satisfied order flow as described later. The new orders stored in said storage means 18 further define a particular second resource offered in exchange for said first resource.

As shown in FIG. 2, at least one of the terminals 12 is connected to the central server 10 via a sub-server 28 which aggregates orders from users before transmitting them to the central server 10. More than one sub-server 28 can be provided and they may be geographically separated such that each sub-server 28 aggregates orders from users in one particular region.

The communication means 24 further communicates the processed orders and their respective coefficients to a further apparatus 30 for the settlement of the orders. The further apparatus 30 performs functions such as debiting and crediting the bank accounts of the users in accordance with the satisfied orders.

In the preferred embodiment, the system requires a braking house which participates in the order process by taking the opposite position from users in respect of the matched user orders. In this way the broking house will be the formal counterparty for all trades executed in the system.

The matching algorithm makes sure that the broking house takes no market risk, and that subject to that condition, the matching is optimal with respect to certain criteria explained below.

The essential function of the optimisation algorithm which lies at the heart of the system is to simulate an "infinitely clever" broking house which is able to search through the order flow available to it in such a way as to satisfy the limit orders in the system to the optimal extent possible. Since there are several possible criteria which determine, from the view point of the broking house, what is optimal, the approach taken in this system is that of "cascading" a number of optimisation criteria. This is done in a way that can be controlled in software. In other words, the broking house (which runs the system) will be able to rank the optimisation criteria, from the most to the least important. Given this ranking, the algorithm will first search for the best overall matching within the meaning of the first optimisation criterion. Having found a set of optimal solutions, it will then search for a smaller set which are also optimal for the second criterion and so on. The most natural setting recommended by the system is to first optimise for volume (for the maximal portion of the order flow that can be satisfied) and then for the broker's revenue. It is assumed that the broker will earn fees simply by maximising the broker's revenue. However, other solutions are possible and can be chosen in real time by the operator or regulator.

The system is capable of being run in hierarchical form, where individual users may sign on via an intermediary institution, such as a clearing bank, which sets their credit limits, and determines margin accounts, communicates these credit limits to the central computer, and thereby causes orders to the truncated if they exceed credit limits.

The system is also able to deal with orders involving arbitrary resource flows as defined in the glossary, for example orders involving more than two raw instruments, orders involving contracts to deliver or receive a specified quantity of a raw instrument at a specified future time and orders involving options to trade raw instruments in the future. The "no risk for the broker" constraint is defined in different ways, depending on the types of instrument involved in the application.

Case 1 (all orders involve only raw instruments). The constraint takes the form: the broker's aggregate trade in the batch involves no negative coefficients. In other words, the broker holds only non-negative amounts in each raw instrument separately.

Case 2 (all orders involve only contracts to deliver or receive specified quantities of raw instruments at specified times). The constraint is that, for the broker's aggregate trade in the batch, at no time should the broker's cumulative position (not counting any position prior to this trade) in any raw instrument be negative.

Case 3 (some or all orders involve options). The constraint is that under all scenarios of exercise or partial exercise of the options held as a result of the match by the other participants in the market, the broker can exercise his own options (also resulting from the match) in such a way that the resulting flows of raw instruments satisfy the constraint of case 2 above.

We now discuss the invention in greater generality. First we describe the case where orders are general simple derivatives, i.e. are represented by a resource flow represented by a finite number of elements of resource space PF(+)×T as explained in the glossary, which are to be treated in the way described in the glossary. Such orders are described by a finite number of portfolia of raw resources (like a currency, share or indeed anything which has a non-negative value); each portfolio with a value-date.

These orders describe certain mutually agreed resource-flows in portfolia of raw instruments (as defined in the glossary). One such portfolio is offered in trade against another such portfolio. Such an order represents willingness to enter into an irrevocable commitment to deliver the components of the portfolio being sold in return for the portfolio being bought, at the value dates specified in the definition of the set of elements that define the simple derivative.

Examples of such simple derivatives are deposits, forwards, futures (with 2 value dates) and swaps (with arbitrarily many value dates) as currently traded in the financial markets.

An order involving only an exchange of a pair of raw instruments corresponds to a point in PF which has precisely two non-zero coordinates, one negative and the other positive. The values of these two coordinates represent the quantity of one resource which is being given up or "sold" in exchange for the other resource which is being acquired or "bought". All other coordinates in PF are zero, in other words for that simple order only two resources are involved. The situation in which the instruments are raw simply means that the orders have the same value-date, typically the present.

The basic constraint defined by the optimisation algorithm is the corresponding constraint to that defined in the discussion of the exchange of raw instruments. These constraints are as follows:

First, that the satisfaction degrees of the orders must lie between 0 and 1.

Secondly, that the broker's return, at any value date, defined as the sum over all resource-flows in raw instruments, at all value dates up to and including that value date, must be non-negative in all raw instruments. This "non-negative" constraint means that at any future value date, the broker will not have a short position in any resource instrument.

The optimisation then performed is to optimise a number of successive target functions of alpha(j), j=1 . . . N, where alpha(j) is the degree of acceptance of the order j. The first of these functions, in a preferred setting, is volume defined as the sum of the absolute values of the elements of the matrix alpha.F, where F is the order matrix (whose (j,k) element denotes the amount of the k-th raw instrument bought or sold in the j-th order, where alpha.F is not the matrix product but denotes the matrix resulting from scalar multiplication of F by alpha row-by-row (i.e. alpha[j] multiplies the row F(j,1), . . . F(j,k), j=1 . . . N), and where value dates are ignored).

An order involving only an exchange of a pair of raw instruments, such as described in the first part of this specification, is a special case corresponding to an order in which a simple resource is offered against another simple resource.

If the order is satisfied to a certain degree alpha (a number between 0 and 1) that portion of the trade has been entered into, and each participant in the trade is required to receive or deliver (according to the sign of the component of the order) the specified raw resource portfolio on its specified value date.

We now turn to the case where orders not only involve raw instruments or simple derivatives, but also options. As already explained, the difference between simple derivatives and options is that, in the latter case, the resource flow is to be realised at the discretion of one of the participants in the option trade (the holding a long position in the option). In this case, the broker must be sure that, regardless of what the other players will do, on the last value date occurring in the order flow, he will not have exposure, i.e. he will hold non-negative positions in all instruments. He does this by a strategy which is inductively defined, by a number of steps equal to the number of value dates occurring in the long and short positions in the options. The induction will commence with the latest option value date. The broker will compute boundaries of the safe region as in the case of simple derivatives and compute the coefficients of acceptance accordingly. By induction, he will then choose the boundaries of all previous regions and hence the coefficients of acceptance of the option orders with earlier value dates, until he finally finds the appropriate region (and hence coefficients) for the earliest option date occurring in the order flow.

Figure 3:
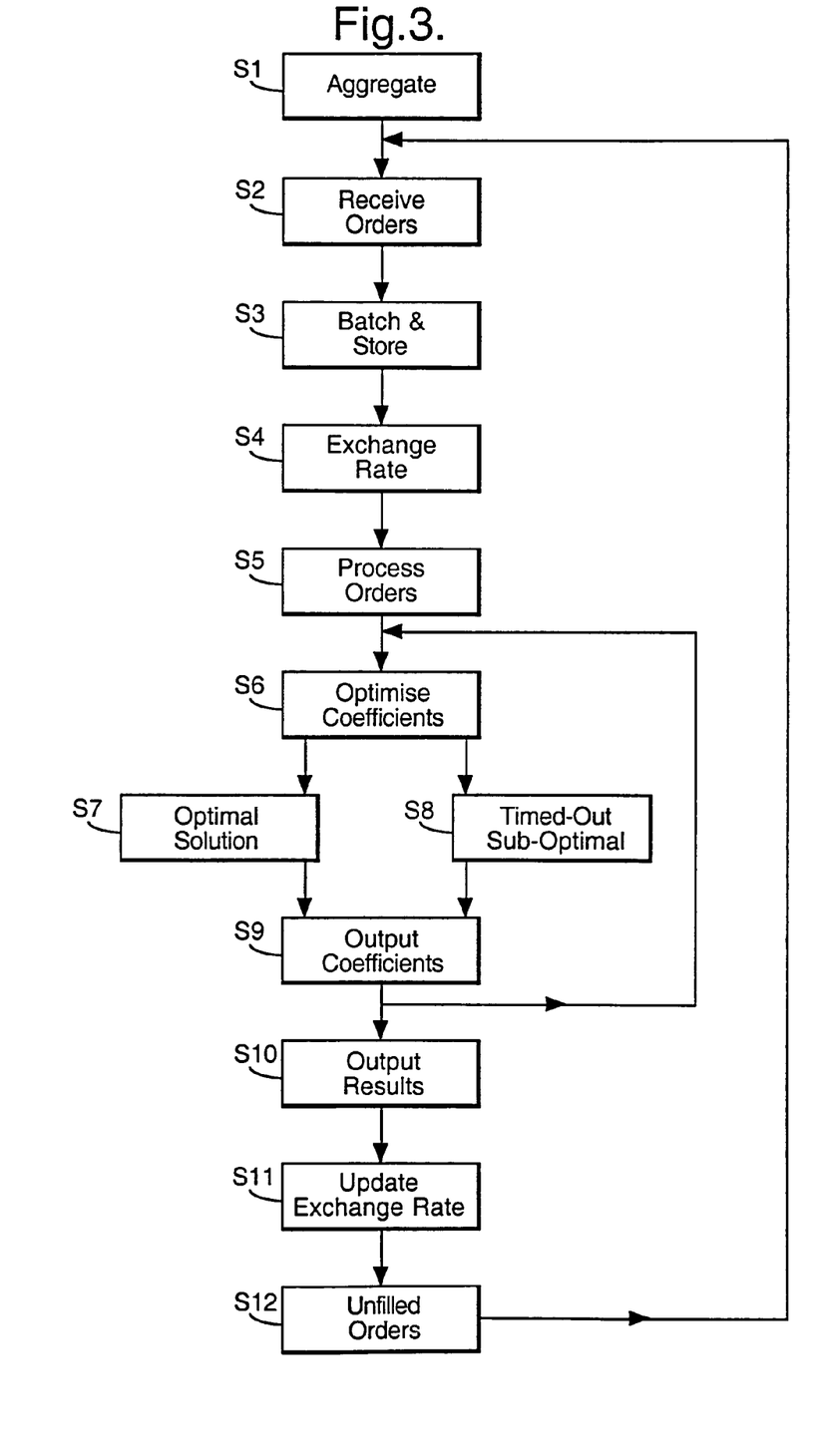
FIG. 3 is a flowchart illustrating a method according to the invention.

The method according to an embodiment of the invention will now be described with reference to the flowchart of FIG. 3.

At step S1 orders are received from users at a sub-server and are aggregated and transmitted to the central server. In step S2 the central server receives orders directly from users and aggregated by sub-servers in step S1 and unfilled orders from previous batches. The central server forms the received orders into a batch. The end of a batch is determined either by the volume of orders exceeding a threshold or a fixed time having elapsed since the previous batch. In step S3 the batch of orders are stored in a first storage means.

In step S4 the processor of the central server retrieves exchange rate data from a third storage means and also retrieves the batch of orders from the first storage means.

In step S5 the orders are processed to calculate a set of parameters defining the optimization problem.

The coefficients are then optimised at step S6. The optimisation is subject to constraints such as the coefficients must be less than or equal to 1 and greater than or equal to 0 and ensuring that the broker is not exposed to any risk. The coefficients are optimised with respect to a particular criterion, such as, maximising the total volume of satisfied orders and maximising the brokers revenue. The optimisation is performed by a software module. If an optimal solution is found the system proceeds to step S7. If a preset period of time elapses without an optimal solution being found the system proceeds to step S8.

In step S7 the optimising routine outputs data representing the optimised coefficients. In step S8 the optimising routine outputs data representing a sub-optimal set of coefficient values.

In step S9 the data representing the coefficient values output in step S7 or step S8 is stored in a second storage means. If all the optimisation criteria have been applied, the system proceeds to step S10, otherwise the system returns to step S6 to optimise the matching with respect to the next criterion. A number of different optimisation criteria are successively applied (usually 2, corresponding to maximising the volume and maximising the broker's revenue).

In step S10 the resulting processed orders and their coefficients are output. This output is communicated to the users and to a mechanism for the settlement of the orders.

In step S11 the processor of the central server calculates new exchange rate data for the resources being traded based on the satisfied order flow. The new exchange rate data is used to update that in the third storage means. The exchange rate data may also be communicated to the users of the system.

In step S12 orders that are unfilled, either completely or partially, and which have not been withdrawn by the user that submitted them and for which a specified period of time has not elapsed since they were submitted are returned to be processed in the next batch with any new orders received from users at step S2.

Sources of algorithms for solving the optimisation problems to which this method reduces the problem of optimal matching are: N. K. Karmarkar. A new polynomial-time algorithm for linear programming. Combinatorica, 4:373-395.

C. Roos. T. Terlaky, J-Ph Val Theory and Algorithms for Linear Optimisation, An Interior Point Approach, J. Wiley, 1997.

B. Jansen C. Roos, T. Terlaky, J-Ph Vial, Primal-Dual Algorithms for linear programming based on the logarithmic barrier method J. of Optimisation, Theory and Applications, 83:1-26, 1994.

R. Sedgewick, Algorithms in C++, Addison Wesley, 1992.

W. H. Press et al., Numerical Recipes in C, 2nd ed. Cambridge, 1992.

Examples of the functioning of the apparatus can be given which, even in the very simplest market situations, illustrate the superiority of the matching algorithm which lies at the core of this invention over the conventional method of 'binary matching'.

These simplest cases are described by trades that are re-allocations of a certain number N of instruments among N traders. This is of course an idealisation of real market situations, in which there will be exchange rates involved, and the number of commodities will be different from the number of traders, but even in this case we can explain the general method.

In mathematical language such a re-allocation is described as a permutation (an element of the finite group S(N)). From the view point of markets, all permutations are equally likely to represent moves from given to optimal resource allocations, i.e. preferred trades between the market participants. However, those trades that can be carried out within a conventional (electronic or traditional) trading environment are very rare among these permutations. They are the products of commuting transpositions. In general the probability of an arbitrarily chosen permutation (potential trade) being such a product of commuting transpositions converges towards 0 exponentially as N goes to infinity.

The principal feature of the present invention, as it applies to this simplified scenario described by permutations, is that the matching algorithm will be able to satisfy orders corresponding to any permutation, not just permutations of this very special form. This implies that the gaining efficiency, as measured by the quotient of the probability of finding a match (trade) under the present invention, by comparison with the probability of doing so under a conventional trading arrangement, goes to infinity as the number of traders and instruments goes to infinity.

In conceptual terms, the group theoretic approach to the matching problem is powerful due to recent developments in the theory of buildings, which one of the present inventors has generalised from the context in which they were invented (simple Lie groups) to certain infinite dimensional geometries and continuous geometries (related to II(1) factors in von Neumann algebras). The theory of buildings is very significantly intertwined with the theory of Coxeter groups, and the simplest of these are the symmetric groups on n letters. The "Coxeter" property, in the context of these groups, is expressed by the extraordinary fact that symmetric groups of n letters are essentially amalgamated products of the simplest Abelian group of 2 elements Z/2Z: the group is generated by n−1 transpositions together with the relation that the product of adjacent transpositions has order 3: $s(l)^2=1$, $(s(l)*s(l+1))^3=1$. All properties of the symmetric groups are consequences of these two types of relations. Furthermore, all simple Lie groups have finite groups generated by similar such relations, and the entire theory of representations and classification of Lie groups would not exist without these facts.

There is a great deal of important combinatorial work which is related to these groups. The present invention draws on these ideas in the context of matching algorithms.

A reason why the approach of the present invention is fruitful stems from the fact that orders and matchings have a discrete (combinatorial) aspect, for instance a circular exchange, and more general sorts of partial exchanges, and a continuous one: the size of orders and the exchange rate underlying a limit order. Since one of the key ideas in the sort of geometric group theory implicit in recent research has been the idea of paths being created between pairs of points which lie in a subset whose structure is determined by the symmetric group, and each step in the path by a simple transposition, the approach of the present invention supposes that the solution to the matching problem lies in creating paths from a starting assignment to a final assignment (a partial match). Thus, the multi-dimensional matching problem may be related to the traditional binary matching problem as the case of general higher rank Lie groups is to the group GL(2), where the continuous part of a problem already appears in the rank 1 case where the discrete part of the picture is trivial (Z/2Z).

However, while the language of group theory is relevant to an understanding of the type of combinatorics involved in solving the problem of optimal matching, other more general methods are required for finding the solution in the general case. Such a solution can not be restricted to finding a match in the simplified type of situation just discussed. A solution must be able to cope with situations in which there may be many orders to buy one particular resource against other resources, and where the exchange rates between different products may be very different between different orders.

Now we shall describe a specific simple example in which the present invention can find an optimal match, whereas the traditional methods cannot find a match, and at the same time illustrates how the system finds the optimal match among possible matches, on the basis of 2 criteria.

We consider the following example of an order batch as given by an N by k matrix, where N is the number of orders (in this case 20), and k the number of raw instruments (in this case 10). An example order matrix is as follows:

$$F = \begin{bmatrix} 1 & -1 & 0 & & & & \\ 1-\varepsilon & -1-\varepsilon & 0 & & & & \\ 0 & 1 & -1 & & & & \\ 0 & 1-\varepsilon & -1-\varepsilon & \ldots & & & \\ & & & \vdots & \ddots & & \\ -1 & & & & & & 1 \\ -1-\varepsilon & & & & & & 1-\varepsilon \end{bmatrix}$$

The interpretation of the matrix is that the (j,k) coefficient represents the quantity of the k-th raw instrument involved in the j-th order (the sign indicating whether the raw instrument is paid out or received). A conventional trading apparatus would consider each set of raw instrument pairs (45 such pairs) as a separate market. The total order flow described by the example would then be viewed 'slice by slice' in each of these 45 markets. In the example at hand, each of these markets would only see one order, either only a buy or only a sell, and hence such an apparatus would be unable to match any of these orders to any extent at all.

The present invention, on the other hand, not only finds a match but an optimal match, in the sense of cascaded optimisation criteria. First, it would find a match that would maximise the total value (or volume) over all matched orders. Secondly, it would find, among these, the match that would maximise the net revenue of the broker among such volume maximising orders, or indeed the match that would optimise any other suitable criterion specified.

This two-fold optimisation can be done either by optimising the second optimising criterion on a re-parameterised space of solutions to the first optimisation criterion, or equivalently it can be done within the original space simply by adding the value of the first optimisation criterion on an optimal point as one further constraint to the list of constraints of the first optimisation problem.

The general method would work as follows in this case.

First, the 2-stage optimisation problem would be defined as follows. The independent vector variable alpha would be the vector of 'matching degrees', i.e. the vector of degrees to which individual orders will be accepted (alpha is N-dimensional). In the first stage of the optimisation, the dependent (target) function vol(alpha) is the total volume of the total trade (i.e. the sum of absolute values of all amounts involved in the order). The constraints for the optimisation problem would take the following form:

1. The coefficients (elements of alpha) would lie between 0 and 1 (1 would mean complete acceptance, 0 no acceptance).
2. Each of the N rows of the order matrix will be multiplied by the corresponding coefficient of acceptance.

The resulting matrix N by k has elements which are functions of the N Coefficients {alpha[j], j=1, . . . N}. The constraints then take the following form: For each column of the matrix, form the column sum (which will again be a function of the alpha[j]'s). Call this function CSj(alpha), j=1, . . . k (k the number of raw instruments). Then the j-th constraint is expressed by the condition CSj(alpha)≦0. This constraint means that the broker (who takes the opposite side of each individual trade) will hold non-negative amounts of each instrument if acceptance is defined by the alpha's.

The first stage of the optimisation is relative to a fixed exchange rate matrix which, is used solely for the purpose of computing the volume function. This exchange rate may be the exchange rate computed from a preceding matched batch of orders. Orders can, of course, be entered at arbitrary exchange rates. Having brought the first part of the optimisation problem into this form, we can express it explicitly in terms of alpha. We can then use a standard technique of constrained optimisation to find an optimal solution (with respect to the data described). One such optimal solution to the above example is given by the vector:
(i) alpha=(1, 0, 1, 0, . . . 1, 0).

Another optimal solution is given by the vector:
(ii) alpha=(0, 1, 0, 1, . . . 0, 1).

In other words, the volume optimisation problem is degenerate. We now pick one optimisation solution to the volume optimisation problem, say the solution (i), to compute the value of the optimal value of the function vol, and then discard the solutions (i) and (ii). We now solve the new optimisation problem for the vector variable alpha:
return(alpha) is maximal,
where return is the value of the broker's aggregate trade at the exchange rate for that order batch, subject to the set of constraints (1 and 2 above) plus the additional constraint:
vol(alpha)=20.

We now solve this problem by one of the standard techniques, and find that the unique optimal point for the optimisation problem is given by the point alpha=(0, 1, 0, 1, . . . , 0, 1) for which the broker's return is equal to 20*epsilon.

A further simple example of the functioning of the apparatus and of the method according to the present invention will now be given. In this simple example, three different raw instruments are being traded between four users (P,Q,R,S).

A particular batch of orders would be stored as the following array in the first storage means 18:

$$\begin{bmatrix} P & 1 & -1 & 0 \\ Q & 0 & 1 & -1 \\ R & -1 & 0 & 1 \\ S & -1.2 & 0 & 0.8 \end{bmatrix}$$

The first column contains the user code (P,Q,R,S). Each row represents an example of an order entered by a user on a terminal 12 and transmitted to the central server 10. The coefficients in columns 2 to 4 designate the amounts of the raw instruments that the user wishes to acquire (positive sign) or give up (negative sign). In the example, user P wishes to acquire one unit of raw instrument (I) (second column) (say a currency or a future on a stock index) for a maximum price of one unit of raw instrument (II) (third column). The fundamental order matrix denoted F would be:

$$F = \begin{bmatrix} 1 & -1 & 0 \\ 0 & 1 & -1 \\ -1 & 0 & 1 \\ -1.2 & 0 & 0.8 \end{bmatrix}$$

A user has the option of ordering a desired quantity of a first raw instrument at the prevailing market exchange rate (a quantity which is computed by a best fit method from previous batches by the system and delivered to the user's terminal in real time) in terms of a specific quantity of the second raw instrument. On the other hand, the user has the option to ignore this prevailing market exchange rate and define his own exchange rate. In the illustrated example, users R and S order the same quantity of raw instrument (III) for different amounts of raw instrument (I), which illustrates the fact that user orders need not be related to the prevailing market exchange rate. If an order were made at the prevailing market exchange rate, the CPU 22 would obtain the exchange rate from the third storage means 26. The system will always compute the prevailing exchange rate in real time by a best-fit method using satisfied orders only, as explained later.

Having received the order flow and coded it as the matrix F above, the system will now proceed to produce an optimal matching. The matching produced by the system from the order matrix will be recorded in the second storage means 20, which contains an array MAT with 4 rows and 3 columns (in the general case N rows and k columns where N is the number of orders and k is the number of raw instruments and k and N will always have this meaning):

$$MAT = \begin{bmatrix} 1 & 1 & 1 \\ 2 & 1 & 1 \\ 3 & 0 & 0 \\ 4 & 1 & 1 \end{bmatrix}$$

The coefficients in the second and third column will lie between 0 and 1. This constraint corresponds to the requirements that the user must not get more of a raw instrument than she has ordered, and that she will never receive a negative amount of any raw instrument ordered. The second constraint is that the broking house (which takes the opposite position from the market) must have non-negative amounts of each raw instrument. This corresponds to the requirement that the broking house must bear no risk or exposure, i.e. no short positions in any instrument, without counting previous or outstanding positions the broking house may have. The entries in the third column are further constrained by the corresponding ones in the second column as discussed below. The first column merely represents order numbers and the system keeps track of which user submitted which order numbers.

The first column of MAT denotes an identification code for the number of the order in the batch. The second column denotes the degree to which the ordered quantity of the order can be matched (in this case orders 1, 2 and 4 will be completely matched and order 3 remains totally unmatched) and the third column denotes the degree to which the quantity of the raw instrument offered in payment has been accepted in payment. As order 3 has not been supplied at all, of course order 3 gives rise to no payment, hence the third column third row coefficient is 0.

In general, there is a constraint that MAT[j,3] must be less than or equal to MAT[j,2] since a user can never be forced to pay at a higher exchange rate than that consented to by his order. When the system operates in "natural mode", MAT[j,3] equals MAT[j,2], i.e. the system always charges at precisely the exchange rate specified by the user. However, the system can operate in "spread control mode" in which inequality between the second and third columns is possible and it is by this mechanism that it can be guaranteed that the broker's revenue resulting from matching can not exceed given thresholds.

The CPU 22 performs computations for optimising the coefficients of columns 2 and 3 of the matrix MAT defined above, which codes for the degree to which orders are to be accepted. This computation is done by means of a cascade of optimisation criteria controlled by different apparatuses denoted Ap(i). Each apparatus may be a software routine or module. The routines must be arranged sequentially, Ap(1), . . . , Ap(n). The first routine Ap(1) takes the order batch F and then returns the set of permissible N by 3 coefficient matrices, all of which satisfy the first optimisation criterion, and passes these onto routine Ap(2), and so on until Ap(n) outputs a particular coefficient matrix denoting an optimal coefficient matrix MAT.

In the default case, this cascade will be of length 2 (but the broker can modify the length). The most important optimisation criteria are liquidity (i.e. the total value of the executed trades in the matching) and broker's revenue, i.e. the spread or difference between what is paid in and what is paid out. This is how the broker will earn money within the system. A particular apparatus will now be described in detail with respect to the present example.

Ap(1) will take the order matrix and operate the following transformation on it. We shall denote the number of raw instruments by k and the number of user orders in the batch by N.

First, the matrix D=[B;C] is produced, where B is 8 (in general, 2N) by 4 N dimensional, and C is simply the transpose of the matrix F above (the rows of C correspond to raw instrument indices, the columns to user orders). In general the rows of B will consist of 1 times the j-th unit vector which has a 1 in column j and 0's elsewhere (for rows with index $2j-1$), and $-1$ times the j-th unit vector (for rows with index $2j$).

In the example these matrices are as follows:

$$B = \begin{bmatrix} 1 & 0 & 0 & 0 \\ -1 & 0 & 0 & 0 \\ 0 & 1 & 0 & 0 \\ 0 & -1 & 0 & 0 \\ 0 & 0 & 1 & 0 \\ 0 & 0 & -1 & 0 \\ 0 & 0 & 0 & 1 \\ 0 & 0 & 0 & -1 \end{bmatrix}$$

and $$C = \begin{bmatrix} 1 & 0 & -1 & -1.2 \\ -1 & 1 & 0 & 0 \\ 0 & -1 & 1 & 0.8 \end{bmatrix}$$

The 1-dimensional array b is then produced where b is defined as:

$$b = [1 \; 0 \; 1 \; 0 \; 1 \; 0 \; 1 \; 0 \; 0 \; 0 \; 0]$$

In general, the first 2N entries of b are, alternately 1's and 0's, and the remaining entries are all 0.

An exchange rate matrix E is defined and is stored in third storage means 26. In this example it is a 1-dimensional array of length k:

$$E = [1, u, v]$$

The entries of E denote the values of 1 unit of raw instruments I, II and III (in general 1, . . . k) in terms of the operator's home raw instrument (which is always raw instrument with label I, and hence the first entry of E is always equal to 1. The current exchange rate data itself is stored in terms of a square array such that the (j,k) entry denotes the exchange rate between raw instruments j and k.

There is further an apparatus for producing a 1-dimensional array of length N, whose i-th coefficient will be given by the sum of the absolute values of the amounts of the raw instruments comprising the i-th order, multiplied by the relevant coefficient of the exchange rate matrix E. We call that vector OPT. It is a vector of length N.

Ap(1) then is an apparatus performing one of the known algorithms (e.g. polynomial time) returning a family of solutions to the problem defined by the optimisation problem defined by volume as a target function and by the constraints defined by the two criteria: orders can be satisfied to a degree between 0 and 1, and the broker's return must be non-negative in all instruments.

More explicitly, this is given by the following definition (in terms of this example) of the optimisation routine involved (the "first optimisation routine"):

First optimisation routine: Optimise the real-valued function of a N-dimensional vector argument x, defined by:

$$f(x) = \text{inner product of array } OPT \text{ with } x$$

and the constraints are:

$$D.x \leq \text{transpose}(b)$$

Where D is the (11 by 4 matrix) [B;C], i.e. the matrix whose first 8 rows are those of the matrix B (as above) and whose remaining 3 rows are those of C (as above).

The optimisation apparatus will produce as an output the set of permissible orders according to the first optimisation routine. The form of this output will be a matrix of the form given in this example as MAT above, but with the 2nd column replaced by the transposed vector x expressed as a linear function of parameters, with constraints on these parameters, and the 3rd column being set equal to the $2^{nd}$.

$$\begin{bmatrix} 1 & 1 & 1 \\ 2 & 1 & 1 \\ 3 & t & t \\ 4 & 1-t & 1-t \end{bmatrix}$$

In the example this is the following set of parameterised matrices which we shall denote by o(t):

$$o(t) = \begin{bmatrix} P & 1 & -1 & 0 \\ Q & 0 & 1 & -1 \\ R & -t & 0 & t \\ S & -1.2*(1-t) & 0 & 0.8*(1-t) \end{bmatrix}$$

Here the parameter t ranges from 0 to 1.

The second stage of the optimisation then uses a similar apparatus to the one described for optimisation step 1, in order to optimise the function G(t) where G(t)=Broker's revenue for order o(t)

G(t) is computed as minus the sum of the terms in each column of the matrix o(t), each evaluated at the broker's exchange rate.

The second stage of the optimisation can be explicitly defined in terms of apparatuses analogously to the construction involved in the first optimisation step as follows:

First, the second stage of the optimisation will involve an apparatus for finding the constrained optimum of the following linear function of 2*N variables, where the first N co-ordinates refer, as above, to the coefficients coding for the degree to which orders are being satisfied, and the second N co-ordinates to the degree to which the offered payment is being accepted. For the purposes of the mode described herein, these degrees are the same, but in the general mode they may not be.

The role of the array OPT above is now played by an array OPT2 of twice that length whose coefficients are arrived at as follows:

Firstly, the order matrix is split into two matrices, whose sum is the order matrix, defined uniquely by the property that the first matrix has only non-negative coefficients and the second only non-positive ones. Further, for each of these matrices, and for each row, the sum over all columns is taken, with each entry multiplied by the exchange rate E as above, so that, for both the positive and negative matrix, an array of length N is arrived at. Juxtaposing these two arrays gives the array OPT2. In our example, this array is as follows:

$$\begin{bmatrix} 1 \\ 1 \\ 1 \\ 0.8 \\ -1 \\ -1 \\ -1 \\ -1.2 \end{bmatrix}$$

In the example under discussion, the associated optimisation function of 8 variables is then the sum of the first 3 parameters, plus 0.8 times the fourth parameter, minus the next 3 parameters, minus 1.2 times the last parameter (designating the degree to which the payments involved in the 4 user orders have been accepted). The coefficients in this particular functional form come from the positive and negative component of the matrix F in the obvious way. This is the function which the apparatus seeks to optimise, using the matrix F as it arises from the order flow.

Next the constraints of this optimisation function are coded for in an apparatus which contains the constraints that the jth and N+jth co-ordinates must be equal (in the general case of spread control this constraint will be relaxed), and that the 1st N constraints in terms of the 1st N parameters are the same as before, plus the new constraint that OPT takes the optimal value on these 1st N parameters as that which was the result of optimisation step 1.

Thus, one sees that the only data that the apparatus involved in the first optimisation step needs to record is the value of the function OPT given the constraints described.

In the example, the final answer to the cascaded optimisation routine is the matrix.

$$\begin{bmatrix} P & 1 & -1 & 0 \\ Q & 0 & 1 & -1 \\ R & 0 & 0 & 0 \\ S & -1.2 & 0 & 0.8 \end{bmatrix}$$

Having established through the optimisation stage 1 that all of P and all of Q can be satisfied, and that a mixture of R and S (given by a parameter-t-between 0 and 1) is possible as far as optimisation criterion 1 (the volume at chosen operator exchange rate) is concerned, the 2nd optimisation criterion picks out the solution under which the operator receives the highest price for 1 unit of raw instrument I thus maximising his revenue.

Whenever orders are satisfied, they are fed into the exchange rate apparatus, which maintains a store of recent satisfied orders in order to produce a best fit to the exchange rates of the most recent trades.

An exemplary best fit algorithm in the case of binary orders is as follows:

For each batch of satisfied orders, the following steps are performed:

1. The satisfied orders are added to the store. Each order defines an edge in the "order network" whose nodes correspond to a raw instrument at a value date.

2. The set of orders which can be removed without causing the order network to become disconnected is identified (there are standard algorithms to determine if a network is connected, see e.g. Sedgewick, chapter 29). If this set is non-empty, its oldest member is removed and step 2 is repeated.

3. A 1-dimensional array L, whose elements correspond to vertices of the order graph, is determined as that which minimizes the function DF(L), where DF(L) is the sum over the stored orders of the product of the value of the order and the square of the difference between the logarithm of the exchange rate of the order and the difference between the elements of L corresponding to the raw instruments of the order (there are standard algorithms to perform such least squares optimisations, see e.g. Press et al., chapter 15).

The exchange rate between two raw instrument-value date pairs may then be computed as exp(L[i]-L[j]), where L[i] and L[j] are the elements of L corresponding to the two raw instrument-value date pairs, and this is used to update the exchange rate data in said storage means 26. Unlike conventional systems, offers and bids which have not been satisfied are completely ignored as far as the exchange rate computation is concerned.

The server tracks incoming orders in real time. The new orders being received are added to the existing batch of unfilled orders. A set of batch criteria can be defined by the user, most importantly simply the total volume computed in terms of the broking house's home currency, of the orders comprising the batch. When the criterion is met then the server will compute an optimal matching, using at its core a routine for solving linear programming problems, and communicating the result of the matching (i.e. the vector of partial satisfactions) to both the broking house and the users.

In order to be sure to get an optimal matching in real time, the program allows for a menu of linear programming routines to be used. The program tries each of them for a specified maximal period of time. If the optimisation routine terminates within that time then it returns its optimal value. The program then chooses the best solution (in lexicographic order with respect to the set of optimisation criteria adopted, i.e. starting with the main optimisation criterion, (which in the default setting is volume) and working its way down through all the optimisation criteria adopted. The best solution is then adopted, and the matching recorded and communicated to the participants.

The invention as defined herein involves the principle of 'no market risk'. This is true for each batch separately. When a batch of orders have been processed and a solution found, and assuming that the broker's account and the client accounts are zero at the start of the order match, the position after the orders have been executed will be that the sum of client accounts equals minus the broker's account. The "no market risk" constraint means that as a result of any batch of matched orders the amounts of each resource involved transferred from clients to the broker are always non-negative. In other words the system operator or broker/clearing house holds the negative portfolio to the sum of the client portfolios. The sum of the client portfolio accounts as a result of a batch matching is a non-positive vector in resource space. This vector is called the spread vector. Any strictly negative coefficients are called "spread" earned by the broker in the match. Hence the spread is well defined irrespective of any exchange rate (the matching does not rely on any exchange rate matrix, and individual transactions may occur at different exchange rates from each other).

The broker can earn revenue by keeping the spread or by charging a service charge or a combination of the two. In order to give maximal flexibility to the system operator/broker, a variety of different spread control and charging models can be used with the present invention. Two examples are given below.

The first approach involves continuing to use the volume maximising criterion discussed above, and solves the problem of spread control by the method of rebate of the excess spread. The rebate is defined by a parameter rb between 0 and 1 indicating the degree to which spread will be refunded: 1 means that the spread is refunded to the maximum possible extent and 0 that it is not refunded at all.

The exchange rate matrix E, which underlies this algorithm, may be calculated in the way already outlined above or any other suitable way. Note that in this approach, clients who place orders at below the prevailing exchange rate and which are matched are not penalised in any way for their "underpayment".

Once an exchange rate is defined, the value of accepted orders can be computed at that exchange rate. Some of these orders may have positive value and others negative value. Call the (accepted portions of) orders with negative value 'overpaid orders'. Spread control is a mechanism for re-distributing a portion rb of the total spread to the traders who have had overpaid orders accepted.

To do this, first compute the coefficient of overpayment of an overpaid order as the value of overpayment divided by the total value of all overpaid orders. These coefficients represent a partition of unity. The spread control mechanism is then implemented by crediting the user accounts corresponding to all overpaid orders by an amount which at the exchange rate used for this calculation, is equal to the total spread times the coefficient of overpayment times rb.

The credit to overpaid orders will be distributed in sequence to users in decreasing order according to their coefficient of overpayment. The broker will pay spread in those currencies in which spread is held, starting with the largest holding (in value) and going down as far as is necessary to credit clients in respect of their overpaid orders. The rebate for each order is subtracted from the amount to be paid in respect of that order to the broking house before the amounts involved in the match are settled.

In summary, the rebate approach works as follows:
An optimal match is found as before.
The exchange rate matrix E is calculated.
The rebate is calculated in the above manner using this exchange rate, and the amounts payable to and by the broking house adjusted according to the rebate.

A second approach, referred to as central exchange rate matching, will now be described. This is more radical in that it modifies the matching algorithm described above by sacrificing the principle of obtaining maximal volume for a given order flow.

A spread control parameter theta$\geq$0 is specified. This bounds (or optionally determines) the revenue of the broker, as a fraction of the total traded volume.

Each batch is then processed as follows:
1. A central exchange rate for the batch is determined. There are various possible ways to do this; two will be described below.
2. A derived batch of orders is created as follows:
Each order is processed according to its "generosity" g, determined as the ratio of the exchange rate of the order to the corresponding central exchange rate. For this purpose we define the exchange rate of an order to be the reciprocal of the ratio of the quantity of the ordered raw instrument-value date pair to the quantity of the raw instrument-value date pair offered in exchange. There are three cases:
i) g$\geq$1+theta: the order is added to the new batch, with its exchange rate adjusted so that g=1+theta.
ii) 1$\leq$g<1+theta: the order may optionally be included at its original exchange rate, in the case that it is not desired to enforce a minimum spread payment.
iii) g<1: the order is excluded from the new batch
3. The derived batch is then matched as usual, and the satisfaction coefficient of each order is updated according to the amount traded of a designated principal component of the order.

A simple technique for determining the fixed exchange rate is to perform a trial non-spread-controlled match on the entire batch, and then compute the exchange rate in the usual way using the result of this trial match. A preferred, though computationally more expensive, determination of the fixed rate is as that for which the above algorithm leads to the greatest traded volume. This requires the use of a nonlinear optimization routine (see e.g. Press et al., chapter 10). In this case the target function for optimization may be computed by performing test matches for assumed fixed rates.

The above algorithm easily generalizes to include orders containing more than two components. In this case the derived orders are formed by projection onto a "theta hyperplane" in order space, consisting of those orders which are more generous than the fixed rate by a factor of 1+theta, while those whose specified rate is less generous than this are excluded. This projection may take place along either the positive or negative components of the order, according to which of this the user is willing to allow to vary.

In the first rebate approach discussed above, all orders that are satisfied under the original matching algorithm are still satisfied. Under the single exchange rate algorithm this is no longer true.

Unlike conventional broking systems, which are based on the construct of direct exchanges between counterparties, the present invention allows the user to input a wide range of different sizes of orders. This is due to the fact that, from a mathematical standpoint, the optimisation problem is well defined and indeed invariant under the operations of splitting up a very large order into many small ones, or aggregating any finite number of small orders into one big order. Furthermore, there are effective numerical methods of optimisation which can practically implement the solution to the optimisation problem. As the structure of the most natural optimisation problems arising (as those listed above) is linear, any of the many numerical schemes for solving linear optimisation problems will do the job. The present invention has the advantage that it enables trades which are genuinely non-binary: they are not exchanges between two parties, but are "n-ary exchanges" of k commodities among n traders. A matching can occur between 3 users, P, Q and R, even if P and Q, Q and R, and P and R, as isolated pairs of users would not be in a position to trade. For instance, if P, Q, R held, respectively, 1 unit of three commodities p, q, r, (stocks, options or currencies), but wanted to buy (respectively) q, r, p, at exchange rates all equal to 1, then the system would automatically produce a matching by assigning q to P, r to Q, and p to R.

Similar examples can be constructed which illustrate the general capacity of the system to construct matchings which will take direct advantage of the full range of market participation, both as regards the full set of users and the full set of instruments are concerned. Suppose, for the sake of argument, that there are at any given time users within the system putting in orders, involving 500,000 financial instruments. It is possible to construct examples which show that a matching is possible, and would in fact be constructed by the algorithm, where there would be no satisfiable orders, that is, no trading possible among any 499,999 users trading 499,999 different financial instruments. In other words, the matching algorithm allows for global transactions among an ensemble of users in a large-dimensional instrument market which could not be carried out if any subset of users were to bargain among themselves.

The matching according to these embodiments is not based on bargaining between individuals but on a numerical procedure by which a match, i.e. an allocation of resources among traders, is implemented, and this numerical procedure is centrally computed, not arrived at by conscious and hence specifically informed process involving the individual traders. It is for this reason that it is unnecessary for individual users to be aware of the other orders in the system. Thus anonymity can be preserved, which is a key advantage to users who can place orders without fearing that their entry into the market will perturb the market in a direction opposite to their own interest.

However, a user also has the option of marking certain orders as being visible to other market participants. These orders may then contribute to market depth information in the following manner. A further mode of operation of the present invention is to allow hypothetical orders to be submitted for matching against orders marked as visible. Such orders can be used to obtain market depth information. The orders are hypothetical in that the orders and their respective satisfaction coefficients are not forwarded to a party for settlement, instead the coefficients or information derived from the coefficients is returned to the user. Two examples of this to obtain market depth information are as follows:

(a) a user wishes to know at what exchange rate particular sizes of orders can be satisfied, for example, the user wishes to know the exchange rates at which 10, 20 or 30 million US dollars can be bought for yen. To do this the system iteratively submits hypothetical orders for 30 million US dollars (the largest of the amounts which the user wishes to have market depth information about) at a set of prices, say 120 yen/US$ (very cheap exchange rate), 121 yen/US$ and so on up to 140 yen/US$ (very generous exchange rate). The system then returns the respective coefficients, i.e. the amounts of these orders which can be matched. For instance, in the given example, the coefficients might be 0, 0, 0.2, 0.4, 0.6, 0.8, 1.0, 1.0 . . . , which for an order of 30 million US dollar corresponds to the following amounts of the order which could be satisfied: 0 at 120 yen/US$, 0 at 121 yen/US$, 6 million dollars at 122 yen/US$, 12 million dollars at 123 yen/US$, 18 million dollars at 123 yen/US$, 24 million dollars at 125 yen/US$, 30 million dollars at 126 yen/US$ and so on. In this case the user would be informed that an order for 10 million US dollars could be satisfied at an exchange rate of 123 yen/US$, an order of 20 million US dollars could be satisfied at an exchange rate of 125 yen/US$ and an order for 30 million US dollars could be satisfied at an exchange rate of 126 yen/US$.

(b) alternatively, the user may wish to know the largest amounts of a resource which can be bought at particular exchange rates, for example a user might want to know how many US dollars could be bought at exchange rates of say 130, 131 and 132 yen/US$. In this case the system iteratively submits hypothetical orders of high volume (in practice equal to the largest volume recorded for any order submitted to the system in this particular class of order/instrument pair), for example two hundred million dollars, at each of the prices submitted by the user. These orders are processed in the usual way and the partial satisfaction coefficients are returned. In the above example these might be 0.25, 0.3 and 0.6. The user could then be informed that orders of 50 million US dollars could be satisfied at 130 yen/US$, 60 million US dollars at 131 yen/US$ and 120 million US dollars at 132 yen/US$ (the size of the orders being given by the product of the coefficient and the hypothetical order of 200 million dollars which was submitted).

Although some of the above examples have concerned financial instruments, this is not intended to limit the scope of protection as defined by the claims. For example the invention is applicable to systems for allocating computer time, telecommunication frequencies and bandwidth, power generation and distribution capacity and so on. The invention can be implemented by means of a computer and the invention therefore includes a computer-readable storage medium having recorded thereon a program containing code components that when loaded into a computer will cause the computer to operate according to a method of the invention.

GLOSSARY

The following definitions are given to assist in understanding the terminology used in the above described examples, but are not limitative of the present invention.

Raw Instrument: currencies, equities etc with no time component.

Simple resource: a quantity of a raw instrument.

Portfolio space (PF): the vector space with basis indexed by the set of raw instruments.

PF(+): the set of position vectors in PF with non-negative components. Simple resources are particular elements of this set.

Resource space=finite subsets of PF(+)×T with any two elements having different time component (T). T is the positive time axis and the T coordinate of a point in this space is known as the value-date. PF(+) is identified with the subset consisting of only one element of the form (pf, now).

Compound resources: Points in the resource space.

Resource-flow: a set of pairs of compound resources, as specified by an order. Orders are of the form: buy one compound resource against another compound resource.

Simple derivative: a resource flow (i.e. order) with the rule that, if the order is satisfied, the trader is required to receive or deliver (according to whether the value of the quantity is positive or negative) the specified quantity of each simple resource on its specified value-date.

Option: an instrument giving some market participant rights (but not obligations) to exchange resources at some future date (as opposed to simple derivatives in which the future transfers of simple resources are obligatory on all parties).

The invention claimed is:

1. An apparatus for processing trading orders, said apparatus comprising a central server connected to a plurality of terminals on which user orders are to be entered, wherein said central server comprises:
   communication means for receiving user orders from said terminals via a network;
   first storage means for storing received user orders as an array whose elements define a particular first resource ordered by a particular user;
   second storage means for storing an array of coefficients, where each coefficient of the array represents the proportion of a particular order that is to be satisfied; and
   processing means for retrieving said orders from said first storage means, calculating an optimized set of values of said coefficients with respect to at least one predetermined constraint and at least one predetermined criterion, and storing said optimized coefficient values in said second storage means,
   said communication means also being for transmitting the processed orders and their respective coefficients.

2. An apparatus according to claim 1, wherein said at least one constraint includes that the value of each of said coefficients is less than or equal to 1 and greater than or equal 0.

3. An apparatus according to claim 1, wherein, said processing means is adapted to process orders such that a designated user takes the opposite position to each other user order by agreeing to exchange a proportion of the ordered first resource for a second resource, where said proportion corresponds to the optimized coefficient for that order.

4. An apparatus according to claim 3, wherein said at least one constraint includes that when all orders were to be completed, in proportion to their respective coefficients, the designated user's holdings arising from the processed orders would be only non-negative amounts of each resource, including after maturation of all simple derivatives and options to trade resources in the future.

5. An apparatus according to claim 3, wherein said at least one criterion includes maximizing the revenue of said designated user, in terms of a particular simple resource, based on an exchange rate.

6. An apparatus according to claim 1, wherein said central server further comprises third storage means for storing an array of data representing a current exchange rate between each resource and at least one other resource, and wherein said processing means is further for retrieving exchange rate data from said third storage means.

7. An apparatus according to claim 1, wherein said at least one criterion includes maximizing the volume given by the sum of the absolute values of the components of all orders that are satisfied, partially or in full, in terms of a particular simple resource at a given exchange rate.

8. An apparatus according to claim 1, wherein said processing means is adapted to optimize the values of said coefficients by successively applying respective criteria in a cascaded manner.

9. An apparatus according to claim 8, further comprising means to specify the sequence of said cascaded criteria.

10. An apparatus according to claim 1, said processing means applies, in sequence, each one of a plurality of predefined linear programming routines, or convex programming routines, or standard combinatorial optimization techniques, to optimize said coefficients until one of the following events occurs:
    a specified maximum period of time elapses;
    an optimal solution is found.

11. An apparatus according to claim 10, wherein a consistent sub-optimal solution is used to obtain the optimized set of coefficient values when a specified maximum period of time elapses before an optimal solution is found.

12. An apparatus according to claim 1, wherein said processing means is adapted to optimize said coefficients for batches of received orders.

13. An apparatus according to claim 12, wherein said processing means is adapted to determine the end of a batch by a preset interval of time having elapsed since the start of that batch.

14. An apparatus according to claim 12, wherein said processing means is adapted to determine the end of a batch by the total order value exceeding a threshold value.

15. An apparatus according to claim 12, adapted to carry forward orders not satisfied, completely or partially, in one batch to the next batch.

16. An apparatus according to claim 12, adapted to remove from said first storage means orders not satisfied, completely or partially, after a preset length of time from submission of those orders.

17. An apparatus according to claim 16, wherein said preset length of time for each order is specified by the relevant user.

18. An apparatus according to claim 1, wherein unsatisfied orders are removed from said first storage means at the request of a user.

19. An apparatus according to claim 1, wherein at least one user order stored in said first storage means specifies a particular second resource offered in exchange for said first resource to define a resource flow.

20. An apparatus according to claim 1, wherein at least one user order stored in said first storage means orders said first resource at a prevailing market exchange rate.

21. An apparatus according to claim 1, wherein a resource in at least one order is a compound resource.

22. An apparatus according to claim 1, wherein at least one of said terminals is connected to said central server via a sub-server which aggregates orders from users.

23. An apparatus according to claim 1, wherein said communication means is adapted to transmit orders using TCP/IP.

24. An apparatus according to claim 6, wherein said processing means computes and updates the exchange rates in said third storage means based on the satisfied order flow.

25. An apparatus according to claim 1, wherein instruments being traded are financial, such as currencies, securities, and futures on the value of commodities.

26. An apparatus according to claim 1, wherein said communication means transmits said processed orders and their coefficients to a further apparatus for settlement of said orders.

27. A computer terminal comprising: communication means for receiving the processed orders and their respective coefficients from an apparatus according to claim 1; and a device for triggering transfer of resources in accordance with the filled part of each order specified by the respective coefficient.

28. The apparatus of claim 1 wherein the array of coefficients having one dimension that correlates to the number of orders received from the terminals and may accommodate more than two orders.

* * * * *